Oct. 19, 1943.  E. R. BERGMANN  2,332,431
SHAKER CONVEYER
Filed June 3, 1942  2 Sheets-Sheet 2
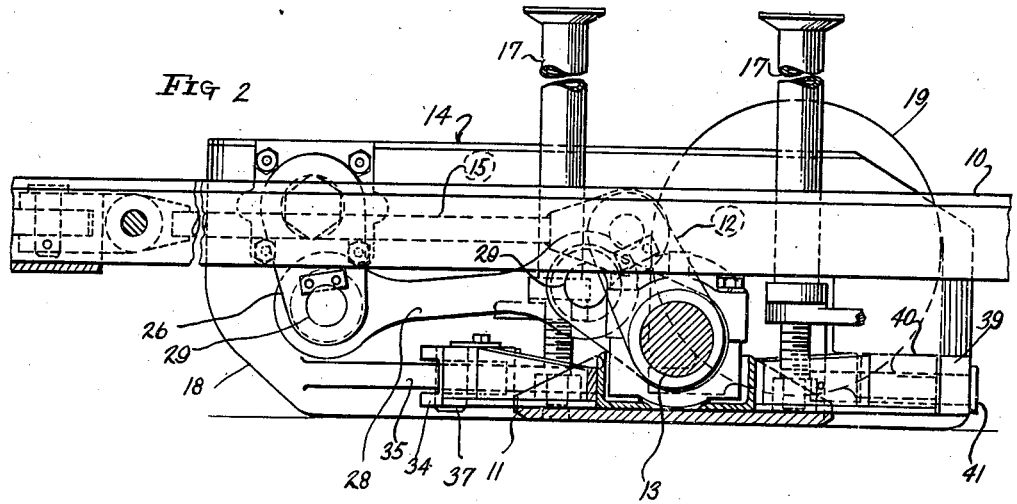
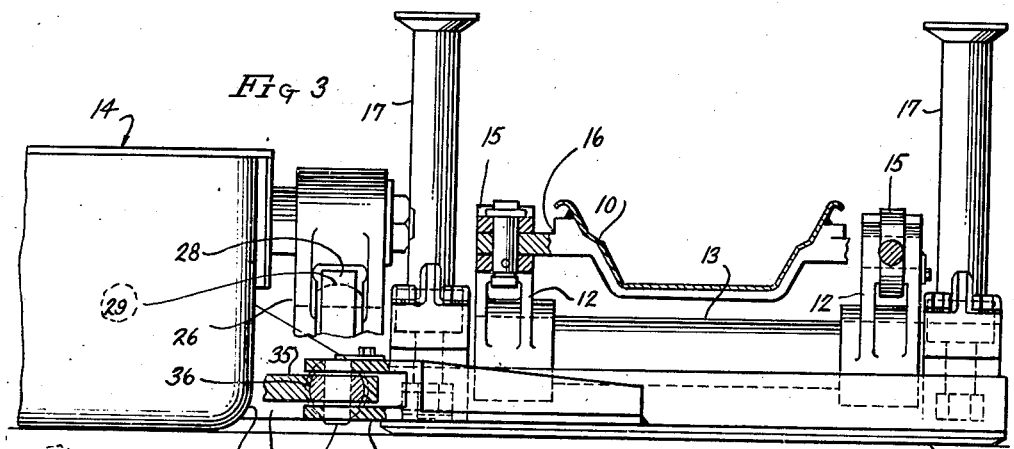
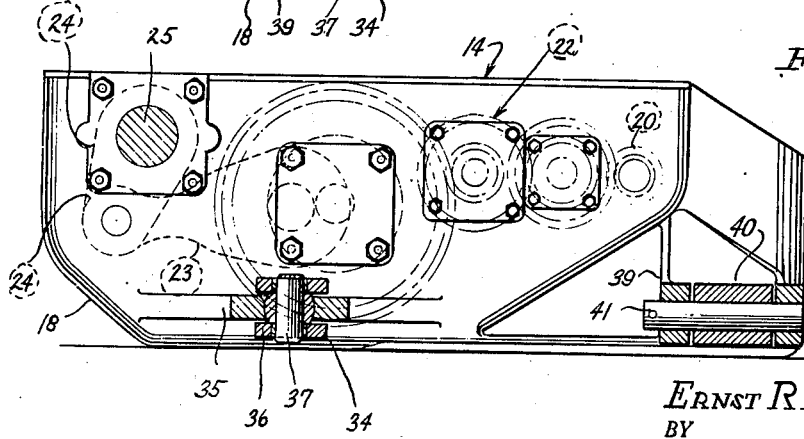
INVENTOR.
ERNST R BERGMANN
BY
Clarence T. Poole
ATTORNEY Patented Oct. 19, 1943

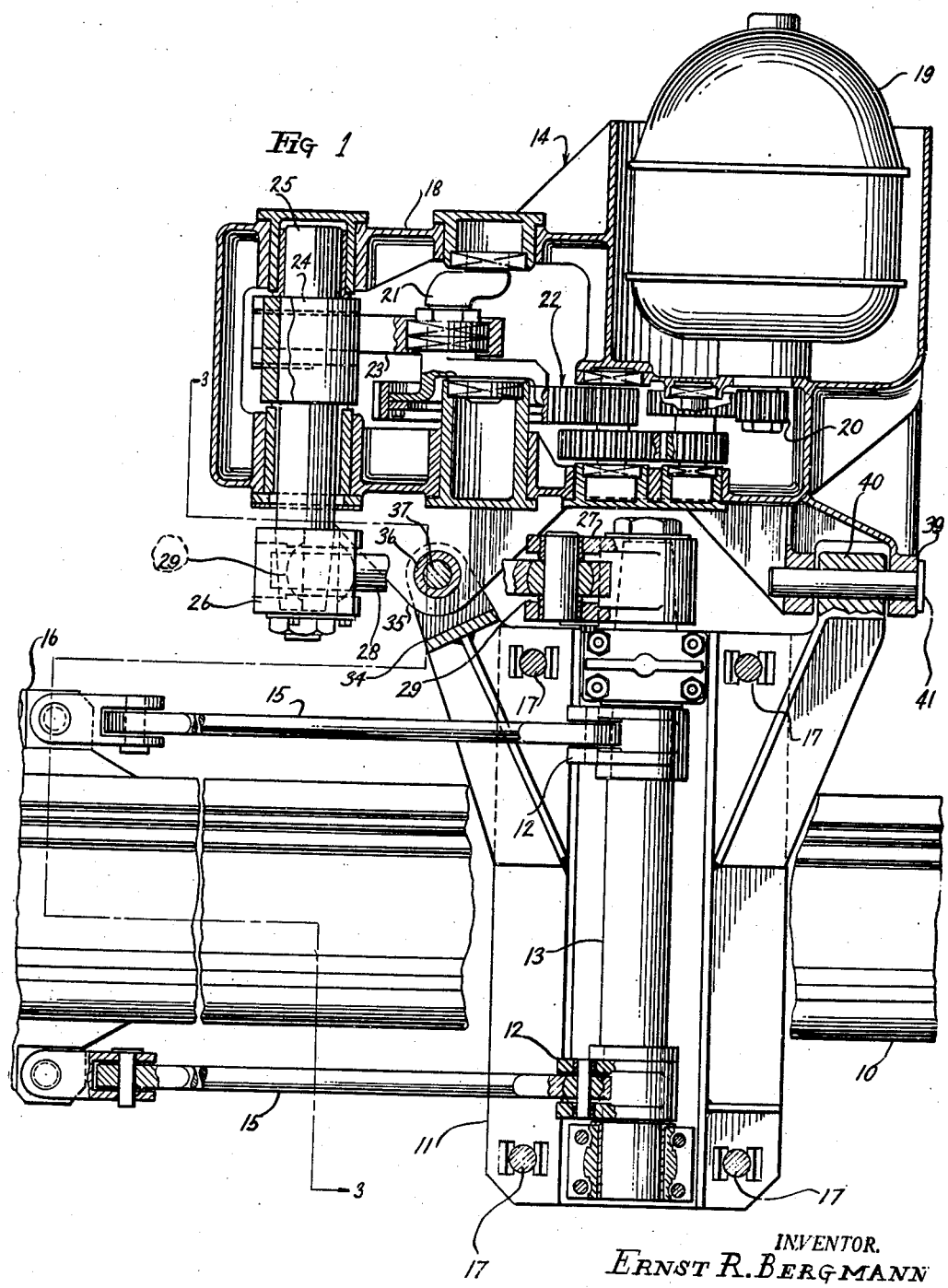

2,332,431

UNITED STATES PATENT OFFICE 2,332,431

SHAKER CONVEYER

Ernst R. Bergmann, Evergreen Park, Ill., assignor to Goodman Manufacturing Company, Chicago, Ill., a corporation of Illinois Application June 3, 1942, Serial No. 445,546

4 Claims. (Cl. 198—220)

This invention relates to improvements in shaker conveyers, and has as its principal objects to provide an improved anchoring device for holding a shaker conveyer drive mechanism in floating engagement with the ground and forming a side drive connection for driving a conveyer trough line, disposed to one side of the drive mechanism.

A more specific object of my invention is to provide an improved side drive anchoring device for a shaker conveyer drive mechanism including an improved connection between the drive mechanism and the anchoring device, permitting a more ready aligning of the drive mechanism with the trough line and facilitating the connecting of the drive mechanism with the anchoring device.

The device of my present invention is constructed along lines somewhat similar to those illustrated in an application Serial No. 397,021, filed by Loy D. Hagenbook on June 7, 1941, but differs therefrom in that an improved form of connecting means is provided between the anchoring device and the drive mechanism, which facilitates the lining up and the connecting of the drive mechanism with the anchoring device.

Other objects of my invention will appear from time to time as the following specification proceeds and with reference to the accompanying drawings wherein:

Figure 1 is a plan view of a shaker conveyer drive mechanism connected to an anchoring device constructed in accordance with my invention, with certain parts broken away and certain other parts shown in substantially horizontal section;

Figure 2 is a view in side elevation of the device shown in Figure 1, with certain parts shown in substantially longitudinal section;

Figure 3 is a fragmentary transverse sectional view taken substantially along line 3—3 of Figure 1; and Figure 4 is a view in side elevation of the drive mechanism, with the connecting parts between the anchoring device and the drive mechanism shown in substantially longitudinal section.

In the embodiment of my invention illustrated in the drawings, a trough section 10 of a shaker conveyer trough line is shown as extending over an anchoring base 11 of an anchoring device constructed in accordance with my invention. Said base serves as a mounting for a pair of spaced rocking arms 12, 12, secured to a transverse shaft 13. Said rocking arms are adapted to form a drive connection for said trough section, from a shaker conveyer drive mechanism indicated generally by reference character 14. The trough section 10 is mounted adjacent its opposite ends on the usual trough supporting means, such as a pair of longitudinally spaced ball frames (not shown), and is driven from the drive mechanism 14 by means of a pair of spaced driving links 15, 15. Said driving links are connected between the rocking arms 12, 12 and opposite ends of a connecting bar 16, which is secured to the bottom of said trough section and extends laterally from opposite sides thereof. Holding jacks 17, 17 are adapted to be interposed between the corners of said base and the mine roof for holding said base in position on the ground.

The drive mechanism 14 may be of any well known form, and as herein shown, includes a casing 18, resting on the ground on its bottom and having a motor 19 mounted on the outer side thereof. Said motor has an armature pinion 20 disposed within said casing and forming a means for rotatably driving a crank 21 through a gear train generally indicated by reference character 22 (see Figure 1). Said crank has a connecting rod 23 journaled thereon, which is connected with a rocking arm 24 on a transverse shaft 25, for rocking said shaft.

One end of the transverse shaft 25 extends outside of the casing and has a rocking arm 26 mounted on its free end, which rocking arm is herein shown as depending from said shaft. Said rocking arm 26 is connected with a rocking arm 27, secured to the inner end of the rocking shaft 13, for rocking said shaft and oscillatively driving the rocking arms 12, 12, by means of a connecting link 28. Said connecting link is connected between said rocking arms through ball and socket connections generally indicated by reference characters 29, 29.

Referring now in particular to the novel form of floating connection between the drive mechanism and the anchoring base 11, said base has a bifurcated outwardly projecting connecting end portion 34, adapted to receive a projecting connecting member 35, between the furcations thereof, which connecting member extends laterally from the casing 18, adjacent the lower end thereof. Clearance is provided between said connecting member and the insides of the furcations of said connecting end portion, to permit relative movement between said casing and anchoring base. A semi-ball-shaped member 36 is journaled within said connecting member 35, and is pivotally connected to said bifurcated connecting end portion by means of a vertical pin 37 extending through said semi-ball-shaped member and secured adjacent its ends in the furcations of said bifurcated end portion 34.

A bifurcated connecting projection 39 extends from the end of the casing 18, opposite from the connecting end portion 34, and the opening between the furcations thereof extends in a vertical plane. Said projection is adapted to extend along opposite sides of a connection member 40, projecting from the side of the anchoring base 11, opposite from the projecting connecting end portion 34. A longitudinally extending horizontal connecting pin 41 is provided to pivotally connect said bifurcated projecting portion with said connecting member and thus connect the casing to said anchoring base for movement about a longitudinal axis.

It should here be noted that a vertical plane extending through the extended longitudinal axis of the pin 41 would intersect and be in alignment with the longitudinal axis of the connecting link 28, if sufficiently extended, and that the axis of longitudinal rocking movement of the casing 18 about the ball 36 is coincident with the longitudinal axis of said pin 41. The drive mechanism may thus rock about an axis disposed beneath and in alignment with the longitudinal axis of the connecting link 28.

When it is desired to set up the drive mechanism on the ground, the pin 37 is first inserted through the connecting end portion 34 and the semi-ball-shaped member 36 and is secured to said connecting end portion. The drive is then horizontally pivoted about the axis of said pin until the bifurcated connecting projection 39 interleaves the connecting member 40. When the apertures extending through said connecting projection and connecting member are in alignment, the pin 41 is inserted through said apertures and is then locked in position. The connecting link 28 is then connected with the rocking arm 27. The drive mechanism may then pivot about the longitudinal axis of said pin 41, which axis intersects a vertical plane extending through the axis of said connecting link.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a drive mechanism for shaker conveyers, an anchoring base adapted to be held in position on the ground during reciprocation of the conveyer, a trough section of a conveyer trough line mounted for reciprocable movement with respect to said base, a rocking member mounted on said base and adapted to have driving connection with said trough section, means for holding said base stationary on the ground during reciprocation of the conveyer, conveyer drive mechanism separate from said anchoring base and including a casing and an oscillatively driven rocking member, a link connecting said rocking member to said rocking member on said anchoring base, for oscillatively driving said rocking member and for reciprocably driving said trough section, and anchoring connections between said anchoring base and said casing, permitting said casing to float with respect to the ground during reciprocation of the conveyer and permitting ready alignment and connection of said casing to said anchoring base, when setting up the conveyer, including a pair of longitudinally spaced pivotal connections between one side of said casing and said anchoring base, one of said connections being arranged to connect said casing to said anchoring base for pivotal movement about a plurality of horizontal axes and about a vertical axis which if extended would intersect the longitudinal center line of said drive link, when said anchoring base is on the same level as said casing, and the other pivotal connection connecting said anchoring base to said casing for pivotal movement about a longitudinal axis.

2. In a drive mechanism for shaker conveyers, an anchoring base adapted to be held in position on the ground during reciprocation of the conveyer, a trough section of a conveyer trough line mounted for reciprocable movement with respect to said base, a rocking member mounted on said base and adapted to have driving connection with said trough section, means for holding said base stationary on the ground during reciprocation of the conveyer, conveyer drive mechanism separate from said anchoring base and including a casing and an oscillatively driven rocking member, a link connecting said rocking member to said rocking member on said anchoring base, for oscillatively driving said rocking member and for reciprocably driving said trough section, a ball and socket connection between said anchoring base and said casing, permitting said casing to float with respect to the ground during reciprocation of the conveyer and permitting ready alignment and connection of said casing to said anchoring base, when setting up the conveyer, and a longitudinally extending pin connecting the opposite side of said anchoring base with said casing for holding said casing for pivotal movement with respect to said anchoring base about a longitudinal axis.

3. In a drive mechanism for shaker conveyers, an anchoring base adapted to be held in position on the ground during reciprocation of the conveyer, a trough section of a conveyer trough line mounted for reciprocable movement with respect to said base, a rocking member mounted on said base and adapted to have driving connection with said trough section, means for holding said base stationary on the ground during reciprocation of the conveyer, conveyer drive mechanism separate from said anchoring base and including a casing and an oscillatively driven rocking member, a link connecting said rocking member to said rocking member on said anchoring base, for oscillatively driving said rocking member and for reciprocably driving said trough section, and a connection between said anchoring base and said casing, permitting said casing to float with respect to the ground during reciprocation of the conveyer and permitting ready alignment and connection of said casing to said anchoring base, when setting up the conveyer, including a ball and socket connection between said anchoring base and casing, said ball and socket connection being disposed to one side of said rocking member and connecting said casing to said anchoring base for movement about both horizontal and vertical axes, and a detachable pin pivotally connecting said casing and anchoring base together, said pin extending longitudinally of said drive mechanism and being disposed on the opposite side of said rocking member from said ball and socket connection and having its longitudinal axis in alignment with the axis of longitudinal pivotal movement of said casing about said ball and socket connection.

4. In a drive mechanism for shaker conveyers, an anchoring base adapted to be held in position on the ground during reciprocation of the conveyer, a trough section of a conveyer trough line mounted for reciprocable movement with respect to said base, a rocking member mounted on said base and adapted to have driving connection with said trough section, means for holding said base stationary on the ground during reciprocation of the conveyer, conveyer drive mechanism separate from said anchoring base and including a casing and an oscillatively driven rocking member, a link connecting said rocking member to said rocking member on said anchoring base, for oscillatively driving said rocking member and for reciprocably driving said trough section, a floating connection disposed to one side of said rocking member and connecting said casing to said anchoring base for movement with respect to said base about both horizontal and vertical axes, the vertical axis of said connection, when extended, intersecting the longitudinal axis of said connecting link, and a pin on the opposite side of said rocking member from said first mentioned connection, for pivotally connecting the opposite end of said anchoring base with said second mentioned base, the longitudinal axis of said pin being in alignment with the longitudinal axis of said first mentioned connection and intersecting an extended vertical plane extending through the longitudinal axis of said link which connects said rocking members together.

ERNST R. BERGMANN.